United States Patent Office 3,252,991
Patented May 24, 1966

3,252,991
CONDITIONING OF PHTHALOCYANINE PIGMENTS
Harold N. Schmidt, Toms River, N.J., and Melvin N. Turetzky, Stamford, Conn., assignors to General Aniline & Film Corporation, New York, N.Y., a corporation of Delaware
No Drawing. Filed May 2, 1962, Ser. No. 191,707
12 Claims. (Cl. 260—314.5)

The present invention relates to improved phthalocyanine pigments and method of preparing the same. More particularly, this invention is directed toward improved phthalocyanine pigments in a finely-divided form exhibiting high tinctorial strength and remarkable softness or easy grinding characteristics.

Crude phthalocyanines are isolated from synthesis mixtures in the form of large crystals of low tinctorial strength which, as a result thereof, makes them unsuitable as pigments for use in paint, enamel and lacquer systems since relatively little surface area is afforded for the reflection of light, thus requiring unduly large quantities of crude phthalocyanines to provide a satisfactory coloring function. In order for phthalocyanines to be employed as pigments for practical purposes, the particle size must be reduced in dimensions from approximately ten microns to about one micron or less.

Heretofore, various methods have been proposed for the conditioning of phthalocyanine pigments so that they can be employed in an economical fashion for use in forms whereby they possess pigmentary value without the employment of unduly large amounts of material to impart the desired coloring function.

A method which has been heretofore employed to impart pigmentary value to crude phthalocyanines, includes the mechanical fracture of the crude phthalocyanine crystals by ball milling in the presence of large amounts of sodium chloride. Another method involves acid pasting crude phthalocyanines by dissolving the same in sulfuric acid followed by subsequent drowning in water to reprecipitate the phthalocyanines in smaller particle size. Still another method involves a technique commonly referred to as "permutoid swelling" and involves contacting a crude phthalocyanine with a relatively large amount of a relatively dilute sulfuric acid having a concentration of the order of about 67.0 weight percent for a relatively long period of time. The product is subsequently drowned in water and hydrolyzed back to the free blue. In this process, however, the crude phthalocyanine is contacted with a large amount of relatively dilute sulfuric acid which involves a slow reaction time and is very time-consuming. Our experience with this process has indicated that when the acid concentration is substantially increased, the conditions otherwise being the same or if the temperature of sulfation is allowed to increase over about 40° C., the pigmentary properties deteriorate rapidly.

It has now been discovered that phthalocyanine pigments characterized by high tinctorial strengths and textures are provided by the method comprising forming a mixture, in intimate contact, of a crude phthalocyanine and a relatively small amount of a strong, non-oxidizing liquid acid of high concentration for a period of time sufficient to induce the formation of an acid-phthalocyanine addition compound without attendant crystal growth and forthwith discharging said mixture into water.

The present invention thus deviates considerably from conventional procedures and is characterized by the fact that the method employs strong, non-oxidizing acids of markedly higher concentration and in much smaller amounts than would normally be suggested. Another distinct advantage of the method of the invention is that the period of acid-contacting is reduced from about twenty hours according to some conventional procedures to a period of time of from about instantaneous to about five minutes, if desired.

The method of this invention is operative for conditioning any phthalocyanine compound produced in any desired manner, such as metal-free phthalocyanine, metal phthalocyanines including copper, nickel, cobalt, zinc and lead phthalocyanines, halogenated metal and metal-free phthalocyanines such as copper hexachlorophthalocyanine and chlorophthalocyanine. The phthalocyanine molecule can also be nuclearly substituted with radicals such as nitro, amino, thio, oxy, carbonyl, alkoxy, aryl, aryloxy and the like.

The operative, strong, non-oxidizing normally liquid acids suitable for use in carrying out the method of the invention include sulfuric acid, phosphoric acid, chlorosulfonic acid, chloroacetic acid, lower alkyl sulfonic acids such as methyl and ethyl sulfonic acids, aryl sulfonic acids, as exemplified by benzene sulfonic acid, ortho-, meta-, and para-toluene sulfonic acids, xylene sulfonic acid and mixtures thereof, and the like. Sulfuric acid and the monocyclic aryl sulfonic acids are preferred for use in carrying out the method of the invention with sulfuric acid being particularly preferred. A particularly preferred embodiment providing excellent economy and results are obtained with mixtures of aryl sulfonic acids and sulfuric acid. The concentration of the acid or mixture of acids employed will obviously depend upon the particular acid employed and the particular phthalocyanine employed. As a general rule, however, the strength of the sulfuric acid employed should be such that the phthalocyanine under treatment should be sulfated but not dissolved in it so that it can be subsequently dispersed.

Thus, as has been pointed out above, the contact time between the phthalocyanine molecule and the strong, non-oxidizing, normally liquid acid is such that sulfation is induced without attendant crystal growth formation. Therefore, while it has been pointed out above that in order to obtain a commercially satisfactory product certain conditions must be observed, it is considered of primary importance that the contact time of the crude phthalocyanine molecule and strong, non-oxidizing, normally liquid acid should be such that the acid-phthalocyanine addition compound is formed without attendant crystal growth.

This effect is obtained in the case of sulfuric acid, when, generally speaking, the sulfuric acid strengths are not such that the phthalocyanine molecule under treatment will be dissolved in said acid, but rather the concentration is only sufficient to form the sulfate of the phthalocyanine employed without dissolving the same prior to dispersing in water. It has been found that the strength can vary from 80 percent to 90 percent for unsubstituted phthalocyanines to from 88 to oleum strengths for the polyhalogen-substituted phthalocyanines. When combined with aryl and alkyl sulfonic acids, it has been found that the amount of alkyl and aryl sulfonic acid dissolved in 80 percent to oleum strength sulfuric acid can vary from 0 percent to 75 percent by weight and preferably 25 percent by weight and still achieve the desired result.

With regard to the particular phthalocyanine molecule under treatment, it has been observed that desirable results are achieved in accordance with the invention when 90 percent sulfuric acid is employed in conditioning chlorine-free copper phthalocyanine. However, if the concentration exceeds about 84 percent, the contact time must be two minutes or less, otherwise sulfation is effected along with crystal growth. Thus, it has been observed that as the concentration of the acid employed is increased, the contact time must be less, otherwise large pigment particles are produced resulting in low tinctorial strength. However, as the degree of chlorination of the phthalocyanine molecule increases, so must the acid concentration. Thus, in other words, it is preferable that sulfuric acid concentrations employed for conditioning chlorine-free copper phthalocyanines in accordance with the method of the invention should be of the order of 90 percent sulfuric acid provided that if the concentration exceeds 84 percent, the contact time must be shortened to two minutes or less so as to accomplish sulfation without attendant crystal growth.

With regard, however, to chlorinated phthalocyanines, it has been observed that as the degree of chlorination increases, so must the concentration of acid and particularly sulfuric acid. In this respect, it has been observed that when sulfuric acid is employed as the sulfation agent, the concentrations of sulfuric acid of the order of 84 percent are best employed when the organic chlorine content of the phthalocyanine molecule is or the order of about 3 percent chlorine whereas a chlorine content of about 5 percent has indicated that a sulfuric acid concentration of about 86 percent provides optimum results. When the phthalocyanine green molecule contains from 13 to 16 chlorine atoms per molecule, 100 percent sulfuric acid has been observed to provide optimum results provided the contact time is maintained at about five minutes.

As hereinbefore pointed out, one of the desirably advantageous features of the invention is the quantity of acid employed. The quantity of acid used should be that amount necessary to produce a doughy, kneadable mass. The particular quantity of acid which will provide this result can readily be determined by routine experimentation. Thus, if the quantity of acid is small, the pigment does not wet out completely. On the other hand, too great an amount of acid will probably lead to excessive crystal growth. In general, optimum results are obtained if the amount of acid employed is in the range of from about 0.5 to 2.5 parts by weight per part of pigment.

As may be observed from the above discussion, the contact time of the acid and the particular phthalocyanine under treatment can be varied over a relatively wide range.

Actual contact time of milling without degradation of quality for unchlorinated copper phthalocyanines is approximately twenty minutes whereas the introduction of chlorine into the molecule extends this time to approximately one hour per atom of chlorine per molecule. In general, it can be stated that the contact time is a period sufficient to induce sulfation of the phthalocyanine without attendant crystal growth. This result is achieved, as hereinbefore stated, by employing a relatively small amount of an acid markedly higher in concentration for a relatively shorter period of time as compared to conventional acid pasting techniques.

The temperature at which the method of the invention can be carried out can be varied over a considerable range and is not necessarily critical. It is preferred, however, for reasons of economy, to operate at a temperature in the range of from 20° C. to 60° C.

One of the remarkable advantages of the method of the invention is that the time from acid contact to drowning is shortened from about 20 hours according to conventional techniques to a few minutes depending on the acid employed for unchlorinated copper phthalocyanines and proportionately longer in the case of chlorinated phthalocyanines as discussed above.

Another advantage possessed by the method of the invention is that the short contact times make it possible to develop a continuous process.

Still another advantage of the method of the invention is the exceedingly high solids content in the press cakes obtained by filtering the drowned mass which are of the order of from about 35 percent to 40 percent as compared to about 20 percent according to other techniques.

The following examples will serve to further illustrate the invention although it is to be understood that the invention is not restricted thereto. The parts are by weight unless otherwise stated.

*Example I*

10 parts of copper phthalocyanine and 18 parts of 82.5 percent sulfuric acid were rapidly mixed together for two minutes on a glass plate with a stainless steel spatula. The resulting magma was dropped into 200 parts of water at 60° C. and under agitation. The resultant slurry was filtered, and washed acid free.

The pigment thus obtained could be flushed into oleoresinous vehicles or it could be dried to give soft powder easily dispersible into oleoresinous vehicles. In either case, the quality of the pigment made it fully competitive with commercial phthalocyanine blue pigments.

*Example II*

100 parts of copper phthalocyanine were added uniformly and simultaneously with 190 parts of 84.4 percent sulfuric acid over 4 minutes to a "Universal Mixer #1595" while cranking the device to extrude the mixed copper phthalocyanine-acid magma essentially as soon as it became mixed. The extrusions were immediately dropped into 2000 parts of water at 70° C. and under agitation.

Filtration and washing of the resulting slurry provided a pigment fully comparable to that of Example I.

*Example III*

10 parts of hexadecachloro copper phthalocyanine and 15 parts of 100 percent sulfuric acid were treated for two minutes as were the ingredients of Example I.

The result was a pigment of strength and shade close to commercially available hexadecachloro copper phthalocyanine with a definite advantage in most cases of superior ease of dispersion as a dry color.

*Example IV*

100 parts of hexadecachloro copper phthalocyanine and 150 parts of 102.5 percent sulfuric acid were treated for four minutes as were the ingredients of Example II.

The result was a pigment very similar in quality to that produced by Example III.

*Example V*

10 parts of metal-free copper phthalocyanine and 20 parts of 85 percent sulfuric acid were treated for two and one-half minutes as were the ingredients of Example I.

The result was a pigment of a quality fully comparable to that which is presently commercially available with the advantage of superior dry color softness.

*Example VI*

100 parts of a copper phthalocyanine containing 3.1 percent chlorine and 200 parts of 82 percent sulfuric acid were treated for four and one-half minutes as were the ingredients of Example II.

Filtration and washing of the resulting slurry provided a pigment fully comparable to that of Example I with the additional property of crystallization resistance in aromatic solvents.

*Example VII*

100 parts of copper phthalocyanine were preblended for three minutes with 250 parts of a 25 percent solution of mixed xylene sulfonic acids in 84 percent sulfuric acid in a porcelain dish. The resulting heavy magma was then passed into a "Universal Mixer #1595" while cranking the device to extrude a uniform heavy mass. The extruded mass was immediately dropped into 2000 parts of water at 0° C. and under agitation.

Filtration and washing of the resultant slurry provided a pigment of brightness and tinctorial properties superior to many commercial phthalocyanine blue pigments.

*Example VIII*

100 parts of hexadecachloro copper phthalocyanine and 175 parts of a 25 percent solution of toluene sulfonic acid in 100 percent sulfuric acid were treated as were the ingredients of Example VI.

Filtration and washing of the resultant slurry provided a pigment of superior brightness and of greater tinctorial strength when compared to many commercial pigments of similar chemical constitution.

*Example IX*

346 parts of 81.3 percent sulfuric acid were placed under agitation using a glass paddle-type stirrer in a beaker. 23 parts of copper phthalocyanine were rapidly dumped into the stirring acid. Stirring was continued for 3 minutes after which the mass appeared uniform. This mass was immediately poured into 2000 parts of vigorously stirring water. The resultant slurry was heated to a boil, boiled five minutes and filtered. The resultant cake was then washed acid-free and dried.

The resultant pigment was found to be readily dispersible in oleoresinous systems and to be of high quality, competitive with commercial phthalocyanine blue pigments.

What is claimed is:

1. The method which comprises forming a mixture, in intimate contact, of a crude phthalocyanine and a strong, non-oxidizing liquid acid having a concentration of at least 80 percent in an amount sufficient to produce a doughy, kneadable mass for a period of time sufficient to induce formation of the acid-phthalocyanine addition compound without attendant crystal growth and forthwith discharging said mixture into water.

2. The method of claim 1 wherein the acid is sulfuric acid.

3. The method of claim 2 wherein the phthalocyanine is copper phthalocyanine.

4. The method of claim 2 wherein the phthalocyanine is metal-free phthalocyanine.

5. The method of claim 2 wherein the phthalocyanine is a halogenated phthalocyanine.

6. The method of claim 3 wherein the acid concentration is from 80 percent to 85 percent.

7. The method of claim 5 wherein the acid concentration is from 80 percent to 90 percent.

8. The method of claim 5 wherein the acid concentration is from 80 percent to 105 percent.

9. The method of claim 1 wherein the acid is a mixture of sulfuric acid and aryl sulfonic acids.

10. The method of claim 9 wherein the phthalocyanine is copper phthalocyanine.

11. The method of claim 9 wherein the phthalocyanine is a halogenated copper phthalocyanine.

12. The method which comprises forming a mixture, in intimate contact, of a crude phthalocyanine and a strong, non-oxidizing liquid acid selected from the group consisting of sulfuric acid and aryl sulfonic acids having a concentration of at least 80 percent in an amount sufficient to produce a doughy, kneadable mass for a period of time sufficient to induce sulfation of the crude phthalocyanine without attendant crystal growth and forthwith discharging said mixture into water.

References Cited by the Examiner

UNITED STATES PATENTS

| | | | |
|---|---|---|---|
| 2,065,928 | 12/1936 | Waldron | 260—314.5 |
| 2,284,685 | 6/1942 | Detrick et al. | 260—314.5 |
| 2,334,812 | 11/1943 | Detrick et al. | 260—314.5 |
| 3,051,720 | 8/1962 | Minnich | 260—314.5 |

WALTER A. MODANCE, *Primary Examiner.*

IRVING MARCUS, NICHOLAS RIZZO, *Examiners.*

JAMES A. PATTEN, *Assistant Examiner.*